March 27, 1951     C. MARBLE ET AL     2,546,647

MAGNET OPERATED SEALED SWITCHBOARD

Filed Aug. 1, 1946     4 Sheets-Sheet 1

*INVENTORS.*
CLARENCE MARBLE
CARL F. RUCKDESCHEL
BY
ATTORNEY

March 27, 1951

C. MARBLE ET AL 2,546,647

MAGNET OPERATED SEALED SWITCHBOARD

Filed Aug. 1, 1946

INVENTORs.
CLARENCE MARBLE
CARL F. RUCKDESCHEL
BY

*Chas. Fu. Candy*

ATTORNEY

March 27, 1951     C. MARBLE ET AL     2,546,647
MAGNET OPERATED SEALED SWITCHBOARD
Filed Aug. 1, 1946     4 Sheets-Sheet 3

FIG. 5

INVENTORS.
CLARENCE MARBLE
CARL F. RUCKDESCHEL
BY
*Chas. W. Candy*
ATTORNEY

March 27, 1951 C. MARBLE ET AL 2,546,647
MAGNET OPERATED SEALED SWITCHBOARD
Filed Aug. 1, 1946 4 Sheets-Sheet 4

FIG. 7

*INVENTORS.*
CLARENCE MARBLE
BY CARL F. RUCKDESCHEL

ATTORNEY

Patented Mar. 27, 1951

2,546,647

UNITED STATES PATENT OFFICE 2,546,647

MAGNET OPERATED SEALED SWITCHBOARD

Clarence Marble, Middlesex, and Carl F. Ruckdeschel, Rochester, N. Y., assignors to Automatic Electric Laboratories, Inc., Chicago, Ill., a corporation of Delaware Application August 1, 1946, Serial No. 687,642

25 Claims. (Cl. 179—94)

This invention relates to telephone systems in general and more particularly to improvements in manually operated switchboards.

Heretofore switching between lines connected to such switchboards has been accomplished by means of manually operated plugs or keys. The switchboard embodied in this invention employs independent movable permanent magnets for operating switching devices to complete connections between the lines connected thereto. The magnets are unattached to the switchboard or any of its parts except by magnetic attraction.

It is an object of this invention to provide a switchboard in which switching operations are accomplished by the movement of unattached permanent magnets.

It is another object of this invention to provide a simple, compact switchboard in which the switching mechanism can be mounted in an enclosure, sealed against dust and moisture and controlled by permanent magnets from outside of the enclosure.

It is a further object of the invention to utilize independent permanent magnets for controlling signals initiated by the connecting lines of a switchboard.

Another object of the invention is to provide in a switchboard mechanical visual signals that can be operated in any position.

One feature of the invention permits the operation of the switchboard when mounted in any position.

Another feature of the invention is that wear will be negligible due to the small number of moving parts and due to the exclusion of dust and moisture from the switching mechanisms.

A further feature of the invention is that the switchboard can be satisfactorily operated in total darkness.

A still further feature of the invention provides protection of the lines and apparatus from high voltage electricity.

Another feature of the invention is that all devices employing bearings, levers, hinges, or the like and all switching contacts can be sealed in a container and that the switchboard can be operated with the electrical power generated by the connecting instruments for signalling and talking.

The above objects and features and others not particularly mentioned at this time will be described in detail in the following specification with the aid of the accompanying drawings comprising Figs. 1, 2, 3, 4, 5 and 6.

The switchboard as presented here is arranged to connect ten telephones simultaneously, that is, establishes five connections with two telephones on each. It consists of a case of non-magnetic material with a top or cover, also of non-magnetic material, which from the side resembles a miniature flight of steps. Switching apparatus, including visual signals, is mounted inside the case and terminals for connecting the switching apparatus to associated lines and to an operator's set extend through the case. Connections between lines, or between lines and the operator are made by moving permanent magnets over the top or cover of the switchboard, the steps, and visual marks on them, serving as indications for the proper positions for the magnets.

In recent years considerable increase in the power of permanent magnets has been effected through the use of new materials. These new magnets of small volume have sufficient attraction for ferrous materials to permit their use in activating small switches. These new magnets do not lose an appreciable amount of their power over long periods of time and are therefore highly suitable for use as employed in this invention. The magnets are not attached to the switchboard except by magnetic attraction and may therefore be removed at any time to a remote location to prevent tampering or unauthorized use of the switchboard.

The top or cover of the switchboard is fastened to the case with machine screws and retaining strips and sealed with a gasket. The terminals for outside connections extending through the case are sealed in the case wall. Translucent or transparent windows are sealed in the wall of the case to make the indicators visible from the outside. All moving parts and contacts except the operator's equipment, the armature adjusting screws, the permanent magnets and the terminals for outside connections are mounted in the interior of the switchboard and are protected from outside atmospheric conditions such as dust and moisture. The switchboard may thus be operated in locations where atmospheric conditions are relatively harmful to electrical contacts and to moving parts and it is uniquely suitable for military field use, for forestry service, or for use on ships.

Figure 1:
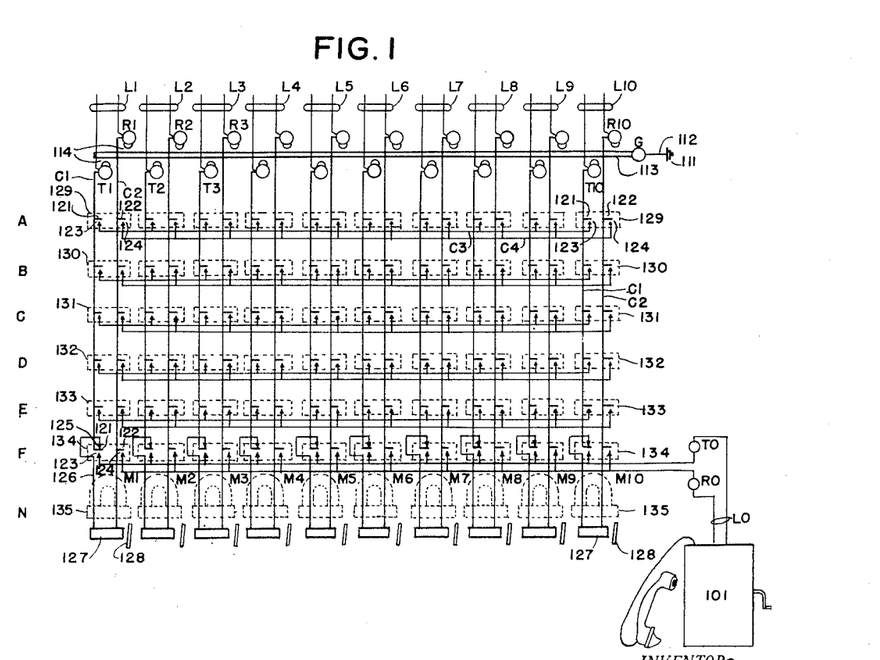
Fig. 1 is a schematic circuit diagram of a ten line switchboard for use with local battery substation equipment.

In Fig. 1 the lines L1 to L10, inclusive, are shown connected to the terminals T1 and R1 to T10 and R10, respectively. The terminal T1 is connected by conductor C1 to the contact springs 121 in each of the connecting commons A to F inclusive, and from common F through contact 125 and conductor 126 to one terminal of coil 127. The terminal R1 is connected by conductor C2 to the contact springs 122 in each of the connecting commons A to F inclusive, and to another terminal of the coil 127. Each of the terminals T2 and R2 to T10 and R10, inclusive, are connected likewise to similar apparatus. Each line is equipped with a local battery telephone set (not shown) which includes a ringer and hand generator suitable for energizing the coil 127 to operate the visual 128. One of the permanent magnets M1 to M10 is associated with each of the lines and in the normal position N cooperate with the armature 135 to control the visual 128 after it has been operated by the coil 127.

In each of the connecting commons A to F inclusive, a conductor C3 terminates on the contact springs 123, and a conductor C4 terminates on the contact springs 124 for each of the lines L1 to L10 inclusive. An armature 129, individual to each of the lines in connecting common A, is operated by one of the permanent magnets, such as magnet M1, which can be moved into proximity to the armature 129 to connect its associated line through conductors C1 and C2 to conductors C3 and C4 through contact springs 121 and 123 and 122 and 124. Thus the magnet M1 placed over the armature 129 for line L1 and the magnet M10 placed over the armature 129 for line L10 connect the lines L1 and L10 through the conductors C3 and C4 of connecting common A.

The C3 conductor and the C4 conductor in the connecting common F are connected to the terminals T0 and R0 respectively, and over the line L0 to the attendant's telephone 101. The telephone 101 is of the well known local battery or magneto type, equipped with the usual talking instrumentalities and a hand generator suitable for operating the ringers of the line telephone sets. The operation of one of the 134 armatures by a magnet, such as the magnet M1, connects its associated line to the attendant's telephone 101 through contacts 121 and 123, contacts 122 and 124, the conductors C3 and C4 of connecting common F and the line L0.

It may be noted that the conductor 113 is separated from the terminals such as T1 and R1 by a small air gap 114. The conductor 113 is connected to the terminal G and over conductor 112 to ground at 111. If a voltage of sufficiently high potential is applied to the line it will arc across the air gap 114 and be drained off to ground at 111. This minimizes the possibility of high potentials such as lightning damaging the line or the connected switching equipment.

Figures 2, 3:
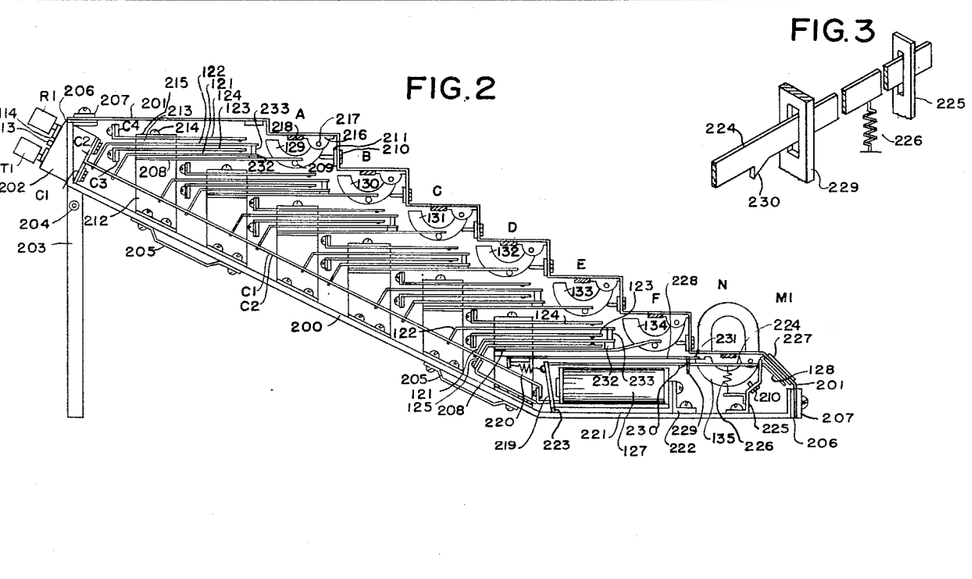
Fig. 2 is an end view shown with the end panel removed.
Fig. 3 is an enlarged view of a portion of the signal locking mechanism.
Figure 4:
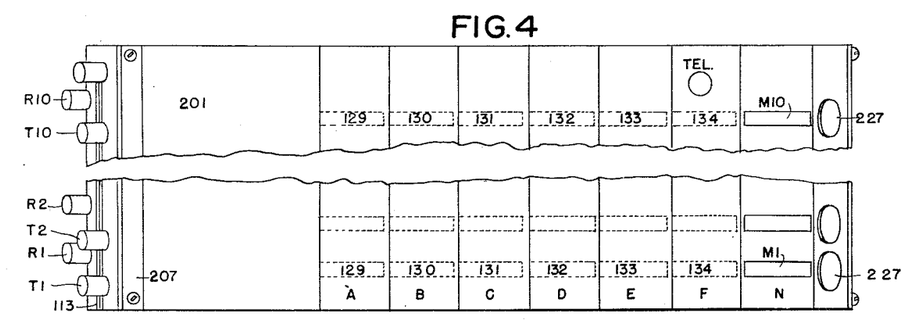
Fig. 4 is a plan view, broken, and showing the location of but three of the line equpiments.

In Fig. 2, the case 200 is shown with the end panel removed. The terminals, such as T1 and R1 are mounted in the strip 202 which is sealed in the case 200. The strip 202 is made of phenol fibre or any suitable insulating material and also serves for mounting the ground conductor 113, which is outside of the case. The support 203 is fastened to the case 200 by hinge 204. Two of such supports are provided and if the switchboard is to rest on a box or a desk, the legs will be lowered to the position shown in Fig. 2. These legs rest against the case 200 while the switchboard is being carried. If the switch board is to be attached to a post or tree, straps (not shown), are passed through the brackets 205, four of which are provided, to hold the switchboard in place. The top 201 and the case 200 are sealed by the gasket 206 and held together by the retaining strips 207 and machine screws.

The switching apparatus shown in Fig. 2 is sufficient for one of the lines, such as the line L1. The contact springs 121, 122, 123 and 124 are mounted on the brackets 212 and secured by the clamping insulators 215 and machine screws 214. The springs are separated by the insulators 213. The contact springs 121 are connected to the conductor C1 and the contact springs 122, 123 and 124 are connected to the conductors C2, C3 and C4, respectively. The operating springs 208 are also mounted on the brackets 212 and rest against the pins 209, normally holding the armatures 129 to 134 inclusive against the armature stops 210. One end of the armatures, such as armature 129, is fastened to the hinge 216 by the pin 217. The hinges 216 are fastened to the inner surface of the top 201 holding the attached ends of the armatures approximately in contact therewith. The strips 211 are provided for mounting the armature stops 210. The strips 218 are provided for re-enforcing the top 201, so that the latter may be constructed from very thin material thus allowing the magnets, such as magnet M1, to most effectively control the armatures, such as armature 129.

One terminal of the coil 127 is connected to the conductor C1 and the other terminal of the coil 127 is connected over the conductor 126 and contact springs 125 and 122 to the conductor C2. The armature 219 is normally held away from the coil 127 by the spring 220, which is attached to the bracket 212. The coil 127 is mounted on the heelpiece 221 which is attached, in the interior of the case 200, to the bracket 222. The armature 219 is movably attached to the heelpiece 221 by the pin 223. The visual indicator 128 is rigidly attached to the armature 219 by the operating bar 224, which is held against the stop 225 by the spring 226. The stop 225 also serves for mounting the armature stop 210 for the armature 135. The window 227 is of translucent material and is sealed in a slope formed in the top 201. With the armature 219 held in the position shown in Fig. 2 the visual indicator 128 is away from the window 227 so that the marking on the visual 128 cannot be seen from the outside.

The magnet M1 is shown holding the armature 135 operated. The operating spring 228 is held against the inner surface of the top 201 at point 231 and the latch 229 which is attached to the operating spring 228 is prepared to engage the stop 230 on the operating bar 224. In case the coil 127 is energized the armature 219 operates moving the visual indicator 128 against the window 227, and with the magnet M1 in the position shown in Fig. 2, the stop 230 engages with the latch 229. The stop 230 engaged with the latch 229 holds the visual indicator 128 against the window 227 so that the marking thereon can be seen from the outside, and holds the armature 219 operated. It may be noted that the visual indicator 128 is moved approximately in the line of vision and that the use of a translucent window permits the visibility of the visual indicator 128 to be controlled by relatively small movements, and that the amount of movement required is not relative to the size of the visual indicator 128 or to the markings thereon. Should the magnet M1 be moved from the position shown in Fig. 2 the operating spring 228 moves the armature 135 against the armature stop 210. The operating spring 228 remains in contact with the armature 135 thus dropping the latch 229 and disengaging it from the stop 230. The armature 219 is restored to normal by the spring 220 and the visual indicator 128 is moved away from the window 227. Replacement of the magnet M1 to the position shown in Fig. 2 reoperates the armature 135 and prepares the latch 229 for engagement with the stop 230.

It may be noted that the visual indicator 128 is held in its normal position by the springs 220 and 226, the operating bar 224 and the stop 225. The visual indicator is held in its operated position by the magnet M1 cooperating with the armature 135, the latch 229 and the stop 230. The armature 135 when not operated by the magnet M1 is held against the armature stop 210, and in this position permits the visual indicator 128 to restore to its normal position. The visual indicator 128 can thus be controlled from without the switchboard and can be operated satisfactorily regardless of how the switchboard is mounted.

The armature 129 in connecting common A is shown in its normal position resting against the armature stop 210 under pressure of the operating spring 208. Contact springs 121 and 123 are controlled by the operating spring 208 and the bushings 232 and 233. If the magnet M1 is placed over the armature 129 the free end of the armature 129 is moved against the inner surface of the top 201 and by means of operating the spring 208 the contact spring 121 is moved to engage contact spring 123 and contact spring 122 is moved to engage contact spring 124. The line L1 through terminal T1 is connected through conductor C1, contacts springs 121 and 123 to conductor C3 and through terminal R1 is connected through conductor C2, contact springs 122 and 124 to conductor C4. Similar armatures are provided in connecting common A for each of the lines L2 to L10 inclusive. If the magnet M2 is placed over the armature 129 for the line L2, the line L2 is connected to the conductors C3 and C4 in the same manner as described for the line L1. When the magnet M1 is removed from the connecting common A the operating spring 208 moves the armature 129 to its normal position against the armature stop 210, and allows the contact springs 121 and 123 and 122 and 124 to disengage.

The armatures 134 under control of magnets, such as the magnet M1, likewise serve to connect and disconnect their associated lines to the conductors C3 and C4 in the connecting common F which is associated with the attendant's telephone 101. The operation of an armature 134 also disconnects one terminal of the coil 127 from the line associated therewith.

Assume now that the magnet M1 is in the normal position N and that a call is to be originated on the line L1 and extended to the line L10. The calling party impresses a signalling voltage on the line L1 by means of the hand generator associated with the line telephone set. The coil 127 is energized operating the armature 129 to move the visual indicator 128 against the window 227 and to engage the stop 230 with the latch 229 to hold the visual indicator operated. The attendant observes the signal and removes the magnet M1 from the position N, thus allowing the stop 230 and the latch 229 to disengage and the visual indicator 128 to restore to normal. The magnet M1 is placed over the armature 134 in the position F operating the free end of the armature 134 against the top 201 and by means of operating spring 208 and bushings 232 and 233 engages contact spring 121 with contact spring 123 and contact spring 122 with contact spring 124. The line L1 is thus connected to the attendant's telephone 101 over terminals T1 and R1, conductors C1 and C2, contact springs 121, 123 and 122, 124, conductors C3 and C4, terminal T0 and R0 and the line L0.

The attendant talks to the calling party and finding that a connection to the line L10 is desired visually checks the position of the magnet M10 to determine whether the line L10 is idle. Assume now that the line L10 is idle, that the magnet M10 is in the N position for the line L10, and that the connecting common E is idle. The attendant moves the magnet M1 from the F position, disconnecting the line L1 from the attendant's telephone 101 at contact springs 121, 123 and 122, 124 and places the magnet M1 in the E position for the line L1 thus operating the armature 133 and connecting the line L1 through contact springs 121, 123 and 122, 124 to the conductors C3 and C4 in the connecting common E. The attendant then moves the magnet M10 to the F position for the line L10 operating the armature 134 thereat and connecting line L10 through contact springs 121, 123 and 122, 124 to the line L0 and the attendant's telephone 101. The attendant operates the hand generator associated with the telephone 101 to signal the line L10. The visual indicator 128 associated with the line L10 is disconnected at contact spring 125. The attendant then moves the magnet M10 from the F position disconnecting the line L10 from the attendant's telephone and places the magnet M10 in the E position for the line L10 thus operating the armature 133 and connecting the line L10 through contact springs 121, 123 and 122, 124 to the conductors C3 and C4 in connecting common E and thus to the line L1.

Conversation between the lines L1 and L10 may now be carried on in the usual manner. When the conversation is terminated or if further service from the attendant is desired the hand generator on either line is operated. The coils 127 for the lines L1 and L10 are connected to the conductors C3 and C4 of the connecting common E and are both operated by the voltages developed by the hand generator of either line. The visual indicators 128 for the lines L1 and L10 are momentarily moved against their respective windows 227 but are not held there as the stops 230 cannot engage the latches 229. This momentary visual signal and the buzzing action of the armatures 219 indicate to the attendant the line or lines which are re-signalling. The attendant observing that the visual indicators 128 for the lines L1 and L10 are momentarily visible connects the attendant's telephone 101 to the lines L1 and L10 by moving the magnets M1 and M10 from the E positions for the respective lines to the F positions therefor. The attendant challenges on the lines L1 and L10 and if further service is required sets up a connection by shifting the magnets in the manner previously described. If the call is terminated the attendant places the magnets M1 and M10 in their respective N positions, indicating that the lines L1 and L10 are idle and preparing them for other calls.

An extra magnet may be provided for the attendant so that a connection may be monitored without shifting the two line magnets. The extra magnet is placed in the F position for either of the connected lines and the attendant's telephone is connected directly to one of the lines as previously described and, through the conductors C3 and C4 of the connecting common, to the other of the lines.

Figure 5:
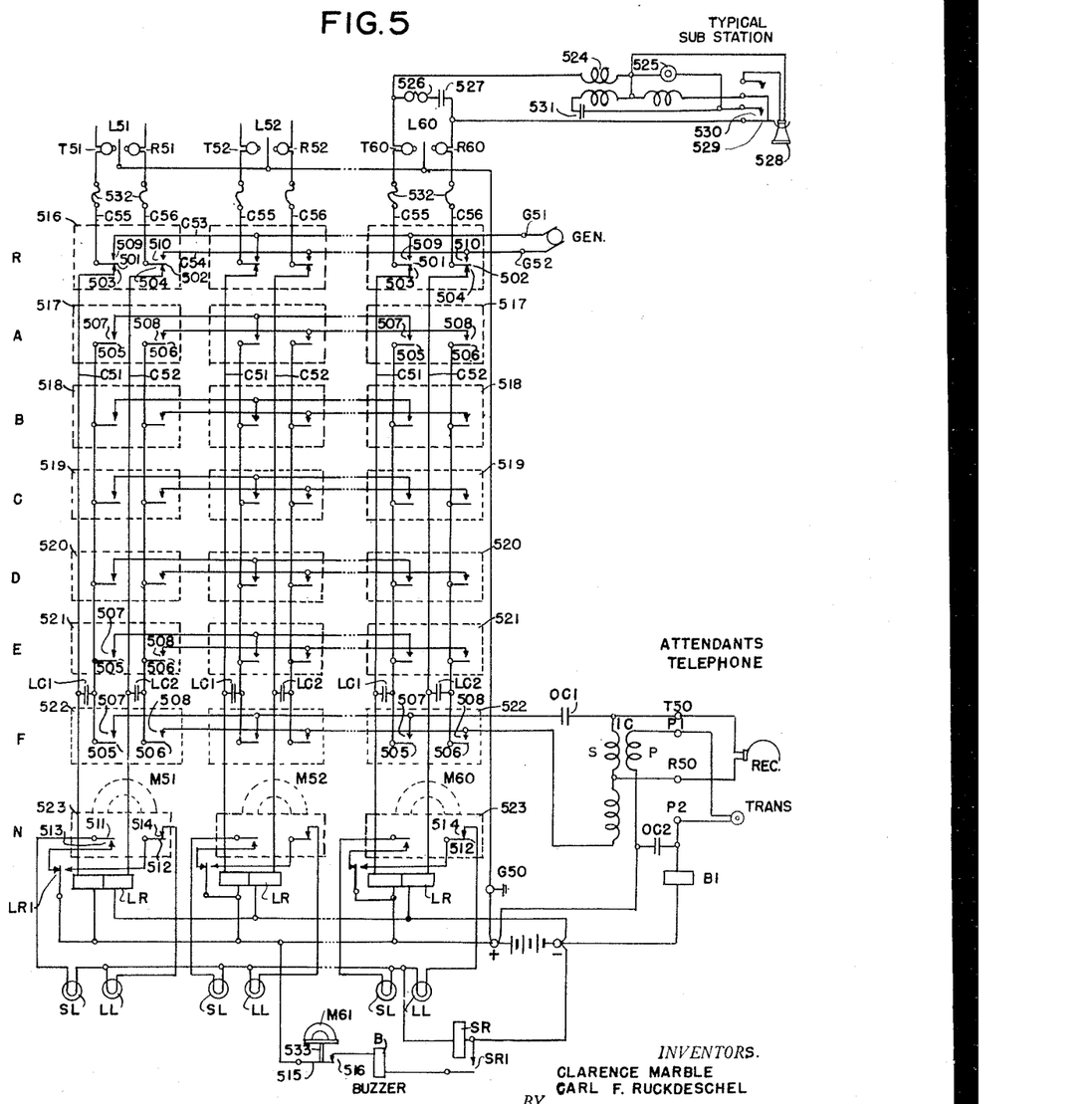
Fig. 5 is a schematic circuit diagram of a common battery switchboard.
Figure 6:
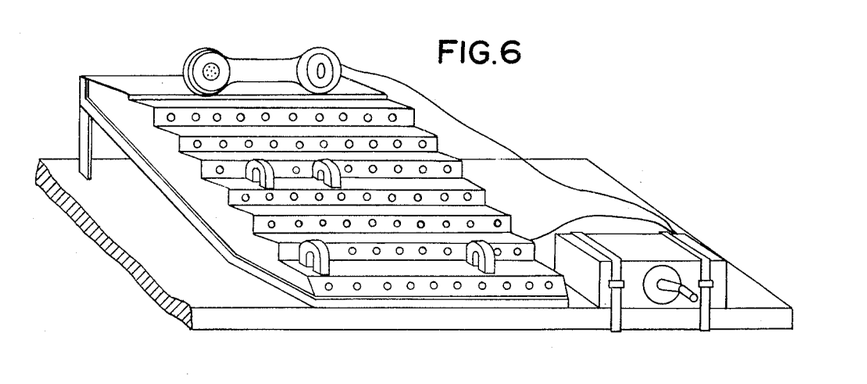
Fig. 6 is a perspective view of the switchboard.
Figure 7:
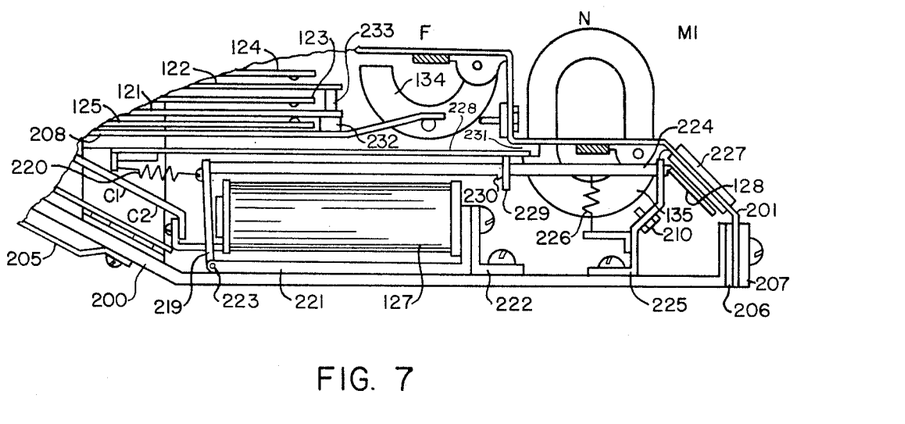
Fig. 7 is an enlarged view of the lower portion of Fig. 2.

In Fig. 5 a schematic diagram for a common battery switchboard is shown. The terminals T50, R50, P1, P2, +, —, G51, G52 and G53 are sealed in a case similar to the case 230, to which a top, similar to the top 201, is sealed and attached. The switching apparatus including contact springs, such as contact springs 501, the line relays LR and the lamps SL and LL are mounted in the interior of the case. The armatures 516 to 523 inclusive for operating the contact springs are mounted inside the case and switching operations are performed by moving the magnets M51 to M60 inclusive over the top of the case and into relation with the armatures. The lamps LL and SL are controlled by the relays LR in co-operation with the magnets, such as the magnet M51, armatures 523, and contact springs 511 to 514 inclusive. Different colored lamp caps are provided for the lamps LL and SL, preferably white for the lamps LL and red for the lamps SL. These lamp caps are sealed in the case and are transparent or translucent so that lighted lamps can be discerned from outside the case.

The line relays LR have double wound coils which are connected to positive and negative battery and to their respective line terminals, such as the terminals T50 and R50, through conductors C51 and C52, contact springs 501, 503 and 502, 504 and the heat coils 532. The conductors C51 and C52 are connected through line condensers LC1 and LC2 to contacts 505 and 506 respectively. The contact springs 505 and 506, operated by the armatures 517 to 522 inclusive under control of the magnets, such as the magnet M56, extend the connection of conductors C51 and C52 through condensers LC1 and LC2 and contact springs 507 and 508 to the conductors of the connecting commons C53 and C54 respectively in the connecting commons A to F inclusive. The contact springs 501 and 502 operated by the armatures 516 under control of the magnets, such as magnet M56, disconnect the conductors C51 and C52 from the relays LR at contact springs 503 and 504 and connect them through contact springs 508 and 509 to the conductors C53 and C54, respectively, of the connecting common R. The conductors C53 and C54 terminate on the terminals G51 and G52. The generator GEN connected to the terminals G51 and G52 is of any well known type, such as a sub-cycle or a hand generator, suitable for operating line ringers such as the ringer 526.

Battery for the lamps LL and SL is taken through the coil of the relay SR, which operates whenever one or more of the lamps is lighted. At armature SR1 the relay closes a circuit to the buzzer B through contact springs 515 and 516 thus providing an audible signal for the attendant. The magnet M61 controls the contact springs 515 and 516 through armature 530. If it is not desired to use the audible signal the magnet M61 is moved away from the armature 530 disengaging the contact springs 515 and 516, thus disabling the buzzer B.

The conductors C53 and C54 of the connecting common F are connected through condenser OC1 to the secondary winding S of the induction coil IC. Taps from the winding S are connected to the terminals T50 and R50 to which are also connected the receiver REC of the attendant's telephone. The transmitter TRANS of the attendant's telephone is connected to the terminals P1 and P2. The terminal P1 is connected to one terminal of the primary winding P of induction coil IC. The other terminal of the winding P is connected to positive battery at the terminal +. The terminal P2 is connected to one terminal of the battery feed impedance B1, the other terminal of which is connected to negative battery at the terminal —. The condenser OC2 provides a low impedance path for voice currents through the transmitter and the primary winding P of the induction coil IC.

The typical substation set is of the well known common battery type and is shown connected over line L60 to the terminals T60 and R60. Assume now that a call is originated over the line L60 and that the receiver 528 is removed from the switchhook 529. A circuit may now be traced to the relay LR associated with the line L60 from battery at the terminal —, right winding the relay LR, conductor C52, contact springs 504 and 502, conductor C56, heat coil 532, terminal R60 lower conductor of line L60, contact springs 530, transmitter 525, induction coil winding 524, upper conductor of line L60, terminal T60, heat coil 532, conductor C55 contact springs 501 and 503, left winding of the relay LR, to positive battery at terminal +. The relay LR operates and closes a circuit to the lamp LL from positive battery at terminal +, armature LR1, contact springs 512 and 514, lamp LL, winding of the relay SR to negative battery at terminal —. The lamp LL lights, signalling the attendant, and the relay SR operates. If the contact springs 515 and 516 are engaged as shown in Fig. 5 the attendant receives an audible signal from the buzzer B as previously described.

To answer the attendant moves the magnet M60 from the N position for the line L60, opening contact springs 512 and 514 and closing contact springs 511 and 513, and places it over the armature 522 in the F position for the line L60. The lamp LL is extinguished when its circuit is opened at contact springs 512 and 514. The armature 522 is operated by the magnet M60 in the F position, engaging contact spring 505 with contact spring 507 and contact spring 506 with contact spring 508 thus connecting the attendant's telephone through conductors C53 and C54 of the connecting common F and the line condenser LC1 and LC2 to the line L60. The attendant now may converse with the calling subscriber and determine what service is required.

Assuming that a connection with the line L51 is desired, the attendant observes the position of the magnet M51, and assuming that it is in the N position for the line L51 and the lamp SL is not lighted, the line L51 is indicated as being idle. The attendant removes the magnet M51 from the N position disengaging the contact springs 512 and 514 and engaging the contact springs 511 and 513. The lamp SL for the line L51 is lighted from battery at terminal —, winding of the relay SR, lamp SL, contact springs 511 and 513, armature LR1, to ground at terminal +. The magnet M51 is placed over the armature 518 in the R position for the line L51, connecting generator through the conductor C53 and C54 of the connecting common R, contact springs 501, 509 and contact springs 502, 510, to the terminals T51 and R51 and the line L51 to signal the called substation. The magnet M60 is moved from the F position for the line L60 to the A position for line L60, assuming that the connecting common A is not in use, and the line L60 is connected through condensers LC1 and LC2 and contact springs 505, 507 and 506, 508 to the conductors C53 and C54 of connecting common A. After the line L51 has been signalled the magnet M51 is moved from the R position for the line L51 connecting conductors C55 and C56 to conductors C51 and C52 through contact springs 501, 503 and 502, 504, and the magnet M51 is placed over the armature 517 in the position A for the line L51 connecting it through condensers LC1 and LC2 and contact springs 505, 507 and 506, 508 to the conductors C53 and C54 of the connecting common A and thus to the line M60.

The relay LR for the line L51 is connected to the line through terminals T51 and R51 as previously described. When the called substation answers the relay LR is operated in series with the line L51 and the substation transmitter in the same manner as described for the relay LR for the line L60, each of the relays LR supplying transmission battery to its associated line. The relay LR opens the previously traced circuit for the lamp SL at armature LR1. The lamp SL is extinguished to provide answering supervision for the attendant.

It may be noted that if the magnets, such as M51 are not in the N position the supervisory lamps SL may be flashed by the manipulation of the switchhook of the substation on the associated line for supervisory purposes. Likewise the line lamps LL cannot be lighted. When the receivers at the substations for the lines L51 and L60 are replaced the associated LR relays restore and the associated lamps SL are lighted as previously described. The two SL lamps being lighted steadily indicates to the attendant that the call is terminated. The magnets M51 and M60 are removed from the A positions, disconnecting their associated lines from the connecting common A, and are placed in their respective N positions. The contact springs 511 and 513 are disengaged, extinguishing the lamps SL and the contact springs 512 and 514 are engaged preparing circuits for the lamps LL. The position of the magnets M51 and M60 in their respective N positions indicates that the lines are idle.

It may be noted that more than two of the lines can be connected together by placing their magnets in the proper positions on one of the connecting commons. Thus if all of the magnets are placed on one connecting common a conference circuit or a common talking circuit is provided for all of the lines. This feature applies to either the magneto switchboard shown in Fig. 1 or the common battery switchboard shown in Fig. 5.

The armature stops 210 are adjustable thus permitting the armatures, such as the armatures 129 and 517, to be easily moved into normal positions which provide favorable movement of the contact springs, such as the contact springs 121 and 505. On the switchboards described the armature stops 210 serve as stops or marks which in cooperation with the formed top of the switchboard locate the positions for the magnets in relation to the armatures.

With the switchboards described an extra magnet is provided to permit the attendant to monitor without disturbing the line magnets. The attendant can listen on any connection by placing this extra magnet on the attendant's connecting common for any line of a connection which is to be monitored. By placing this magnet on the attendant's connecting common at one side of the switchboard and shifting it slowly to the other side the attendant can quickly determine whether any connected lines are not in use.

For night operation it is proposed to paint the markings on the visual indicators 128 using radium paint. Similarly markings for locating the positions for the magnets can be painted with radium paint on the outside of the switchboard top.

Where an audible signal is desired, on the magneto switchboard shown in Fig. 1, a clapper can be added to the armature 219 of each line. This clapper striking against the case will cause a loud signal. However, it is believed that the armature 219 will be sufficiently noisy to serve as an audible signal and that the clapper can be omitted.

The magneto switchboard shown in Fig. 1 can be operated using sound-powered telephones on the connecting lines. In case hand generators are not supplied for the lines the visual signals will not be used and calls can be answered either by shifting the extra magnet across the attendant's connecting common periodically and challenging each idle line or by placing the line magnets on the attendant's connecting common when lines are not in use, and then, when a call is received, requesting the number of the calling line. Connections are set up through the connecting commons as previously described and are supervised by monitoring with the extra magnet.

Having described my invention what is considered to be new and is desired to be protected by Letters Patent will be set forth in the following claims.

What is claimed is:

1. In a switching system, a container comprising a case and a cover, switching equipment including an operating spring and an armature mounted therein, means for sealing said cover to said case to protect said switching equipment from dust and moisture, a movable permanent magnet free of any mechanical and electrical attachments, a marked location on said cover for said permanent magnet, said operating spring and said armature being operable to one position in case said permanent magnet is placed in said marked location, said operating spring being effective for moving said armature to another position in case said permanent magnet is moved from said marked location, an adjustable stop mounted in said cover, said stop being operable from outside of said cover to control said other position of said armature.

2. In a switching system, contact springs, a casing, means for mounting said contact springs in said casing, a rigid cover of non-magnetic material attachable to said casing, a soft iron armature, a hinge for said armature attached to said cover, one end of said armature being rounded and being held approximately in contact with said cover by said hinge, an adjustable armature stop in said cover, an operating spring for holding said armature movably against said stop, the other end of said armature being movable between said stop and said cover, said stop being adjustable to control the amount of said movement, said operating spring being effective in response to the movement of said armature for controlling said contact springs, a free permanent magnet, visible markings on said cover for indicating a position for said magnet, and said magnet being movable to and from said position to control the movement of said armature between said stop and said cover.

3. In a switching system, a plurality of contact springs, a sealed container for enclosing said contact springs, an adjustable stop for controlling the position of one group of said springs in relation to another group of said springs, said stop being sealed in said container and operable from outside of said container, an unattached permanent magnet, means responsive to the movement of said permanent magnet into a predetermined relation with said contact springs for changing the position of said one group of contact springs in relation to said other group of contact springs, said adjustable stop being operable to control the amount of said change.

4. In an electrical control system, a plurality of control devices each having an armature responsive to magnetic force, a sealed case for enclosing said control devices, an adjustable stop for each of said armatures, said adjustable stops being accessible from outside of said case, an unattached permanent magnet, a position for said magnet on said case for each of said control devices, visible markings including said adjustable stops on said case for locating said positions, said armatures being selectively operable in response to movement of said permanent magnet to and from positions located by said visible markings for operating their corresponding control devices, said adjustable stops being operable to provide the combination of effective control of said armatures by said permanent magnet and satisfactory operation of said control devices.

5. In a signalling system, a mechanical visual signal having a normal position and an operated position, means for operating said signal to said operated position, a latch, a movable permanent magnet, means responsive to the movement of said permanent magnet for operating said latch, said latch being effective in case said permanent magnet is in one position and said signal is operated to said operated position for holding said signal therein, means for restoring said signal to its normal position, said last mentioned means being operative in response to the movement of said permanent magnet from said one position.

6. In a signalling system, a mechanical indicator, a spring for holding said indicator in a normal position, an armature responsive to magnetic force, another spring for holding said armature in a normal position, a latch associated with said other spring and said indicator, a permanent magnet manually movable into relation with said armature to operate it from its normal position, means for operating said indicator from its normal position, said latch being effective to hold said indicator in its operated position in case said armature is operated from its normal position by said permanent magnet, said other spring being effective to operate said latch in case said permanent magnet is moved away from said armature, said first spring and said operating means thereafter being effective for controlling said indicator.

7. In a signalling system, a visible signal, a sealed container for enclosing said signal, a window sealed in said container to permit said signal to be discerned from outside of said container, means for operating said signal from outside of said container, an independent permanent magnet outside said container, and means for controlling said signal, said last means being inside of said container and operable under control of said permanent magnet.

8. In a signalling system, a visual signal, a translucent cover for said signal, means for operating said signal to make said signal visible thru said cover, a movable permanent magnet, a marked position for said permanent magnet, control means for controlling the visibility of said signal in cooperation with said first means, said control means being responsive to the movement of said permanent magnet to and from said marked position.

9. In a signalling system, a mechanical visual signal, a translucent cover for said mechanical signal, operating means for moving said mechanical signal to and from proximity with said cover, said mechanical signal being visible only when moved into proximity with said cover, an unattached and movable permanent magnet, a marked position for said permanent magnet, control means for controlling the visibility of said mechanical signal in cooperation with said operating means, said control means being responsive to the movement of said permanent magnet to and from said marked position, said two means and said marked position associated with said mechanical signal so that it can be operated and controlled when mounted in any position.

10. In a switching system, a switchboard having lines and links for establishing connections between said lines, a switch for each line in each link, permanent magnets, and means whereby said permanent magnets operate said switches individually to establish a connection between any two of said lines thru any one of said links and to establish a connection between any other of said lines thru another one of said links.

11. In a signalling system, a switchboard, a plurality of lines, means at said switchboard for establishing connections between said lines, a visual signal for each of said lines, a permanent magnet for each of said signals, each magnet having a normal position in relation to its respective signal and attached thereto only by magnetic force, said magnets being manually removable from said normal positions, means for operating said signals under control of said lines to signal said switchboard to further the establishment of connections between said lines, means responsive to the operation of said signals and effective in case said magnets are in said normal positions for holding said signals operated under control of their respective magnets, and means responsive to the movement of said magnets from their normal positions for restoring said signals.

12. In a signalling system, a switchboard, a line terminating at said switchboard, a mechanical visual signal in said switchboard having a control armature, an independent permanent magnet, a normal position for said permanent magnet visually marked in relation to said control armature, said permanent magnet being manually movable to and from said normal position, means for operating said signal under control of said line, said control armature and said permanent magnet in its normal position cooperating thereafter to hold said signal operated, and means for releasing said signal in case said permanent magnet is moved from its normal position.

13. In a switching system, a switchboard including connecting commons, a plurality of lines terminating thereat, a movable permanent magnet and a signal for each of said lines, a plurality of marked positions for each of said permanent magnets, said permanent magnets being movable to and from said marked positions, means responsive to such movements of said permanent magnets for controlling said signals and for controlling connections between said lines thru said connecting commons.

14. In a switching system, a switchboard including connecting commons, a plurality of lines, a signal and an independent permanent magnet at said switchboard for each of said lines, means for operating said signals under control of their respective lines, said permanent magnets being manually movable for controlling said signals at said switchboard, and means operative under control of said permanent magnets for selectively connecting said lines to said connecting commons.

15. In a signalling system, a switchboard, a line terminating thereat, two signals for said line, an unattached and movable permanent magnet, a visually marked normal position on said switchboard for said permanent magnet, means for operating one of said signals under control of said line in case said magnet is in its normal position, and means for operating the other of said signals under control of said line in case said magnet is removed from said normal position.

16. In a telephone system, a subscriber's line, a relay for said line, a lamp, an electrical circuit for said lamp, a movable permanent magnet, means whereby said relay is operated under control of said line to control said lamp circuit, and means whereby said lamp circuit is controlled by the forces exerted from the location of said permanent magnet.

17. In a switching system, a switchboard having a plurality of lines and a plurality of links, switching means for each line in each link, a container for enclosing said switching means to protect the same from dust and moisture, permanent magnets outside of said container, and means inside said container under control of the forces exerted by said permanent magnets for operating said switching means to interconnect two or more of said lines thru any one of said links.

18. In a telephone system, a switchboard comprising a sealed case having connecting switches and connecting links mounted therein, a plurality of subscriber lines extending from said switchboard, a plurality of movable permanent magnets, a plurality of visually indicated positions for said permanent magnets on said switchboard, and means whereby the forces exerted by the location of said permanent magnets operate individual ones of said connecting switches in response to the movement of said permanent magnets to individual ones of said indicated positions to selectively connect said lines to said connecting links.

19. In a telephone system, subscriber lines, a switchboard comprising a sealed case for terminating said lines and for establishing connections therebetween, visual signals individual to each of said lines mounted in said case, means for operating said signals under control of their corresponding lines to signal said switchboard, independent and movable permanent magnets outside of said case, means in said case responsive to the movement of said permanent magnets for controlling said signals at said switchboard, and means in said case responsive to the movement of said permanent magnets for controlling connections between said lines.

20. In a telephone system, subscriber lines, a switchboard comprising a sealed case for terminating said lines, mechanical visual signals individual to each of said lines mounted in said case and visible from outside of said case, means for operating said signals under control of their corresponding lines to signal said switchboard, unattached permanent magnets outside of said case individual to each of said signals, and means in said case controllable by said permanent magnets for maintaining said signals operated in case they have been operated under control of said lines, said signals and said means being operative with said switchboard mounted in any position.

21. In a telephone system, a subscriber line, a line relay, two signals, a sealed container, means for mounting said line relay and said two signals in said container, means for connecting said line to said relay, a movable permanent magnet, a plurality of visibly marked positions for said magnet on said container, means for operating and releasing said relay under control of said line, means for operating one of said signals with said permanent magnet in one of said marked positions and with said relay operated, means for releasing said one signal in case said permanent magnet is moved to any other of said marked positions, and means for operating said other signal in case said permanent magnet is moved from said one position and said relay is released.

22. In a telephone system, a plurality of subscriber lines, a switchboard comprising a sealed case having signals one corresponding to each of said lines mounted therein, terminals accessible outside of said case for connecting said lines to said signals, an unattached permanent magnet for each of said lines, a normal position outside of said case for each of said permanent magnets, signalling means individual to said lines, the signal corresponding to any one of said lines being operated over the corresponding line in response to the operation of the signalling means thereof, the permanent magnet corresponding to said one line being effective in its normal position to hold said signal operated, and means responsive to the movement of said one permanent magnet from its normal position for releasing said signal in case it is operated.

23. In a telephone system, a plurality of subscriber lines, a manually operated switchboard, a permanent magnet and a signal for each of said lines at said switchboard, means including said permanent magnets for enabling said subscriber lines to operate their corresponding signals to signal said switchboard, and operator controlled means including said permanent magnets for selectively signalling said subscriber lines.

24. In a telephone system, a plurality of subscriber lines, a switchboard comprising a sealed case, switches and signals mounted therein, at least one of said switches and at least one of said signals individual to each of said lines and connected thereto, operator's equipment, signal transmitting means and signal receiving means individual to each of said lines, permanent magnets one for each of said lines, individual ones of said signals being operative in response to the operation of the signal transmitting means on the corresponding individual lines, means responsive to said permanent magnets for controlling operated ones of said signals, means operable under control of said permanent magnets for selectively connecting said lines to said operator's equipment, operator controlled means including said permanent magnets for selectively operating the signal receiving means of said lines, and means for interconnecting any two of said lines, said last means including two of said permanent magnets and one of the switches for each of said two lines.

25. In a switching system, contacts, an armature for controlling said contacts, a container for enclosing said contacts and said armature, an adjustable stop for controlling said armature, a stop on said container, means for mounting said adjustable stop on said container, a permanent magnet, a position on said container for said permanent magnet, said position located jointly by said stop and said adjustable stop, and means for operating said armature responsive to movement of said magnet to and from said position to control said contacts.

CLARENCE MARBLE.
CARL F. RUCKDESCHEL.

REFERENCES CITED

The following references are of record in the file of this patent:

UNITED STATES PATENTS

| Number | Name | Date |
| --- | --- | --- |
| 215,124 | Hubbard | May 6, 1879 |
| 234,432 | See | Nov. 16, 1880 |
| 990,032 | Clement | Apr. 18, 1911 |
| 1,040,475 | Way | Oct. 8, 1912 |
| 1,061,919 | Miller | May 13, 1913 |
| 1,458,180 | Hammond | June 12, 1923 |
| 2,014,385 | Lamb | Sept. 17, 1935 |
| 2,062,915 | Lamb | Dec. 1, 1936 |
| 2,179,792 | Lappin | Nov. 14, 1939 |
| 2,187,115 | Ellwood et al. | Jan. 16, 1940 |
| 2,303,918 | Dimond | Dec. 1, 1942 |
| 2,306,267 | Kalb | Dec. 22, 1942 |
| 2,322,851 | Kalb | June 29, 1943 |
| 2,323,910 | Hubbell | July 13, 1943 |
| 2,447,753 | Hellmann | Aug. 24, 1948 |

FOREIGN PATENTS

| Number | Country | Date |
| --- | --- | --- |
| 13,237 | Great Britain | of 1909 |